United States Patent
Gierke

(10) Patent No.: US 11,793,185 B2
(45) Date of Patent: Oct. 24, 2023

(54) REAL-TIME FISH MOVEMENT AND LOCATION GUIDE

(71) Applicant: Charles Christopher Gierke, Hudson, WI (US)

(72) Inventor: Charles Christopher Gierke, Hudson, WI (US)

(*) Notice: Subject to any disclaimer, the term of this patent is extended or adjusted under 35 U.S.C. 154(b) by 132 days.

(21) Appl. No.: 17/162,778

(22) Filed: Jan. 29, 2021

(65) Prior Publication Data

US 2021/0227817 A1 Jul. 29, 2021

Related U.S. Application Data

(60) Provisional application No. 62/967,297, filed on Jan. 29, 2020.

(51) Int. Cl.
| | |
|---|---|
| *G01S 15/42* | (2006.01) |
| *G01W 1/10* | (2006.01) |
| *G01S 15/96* | (2006.01) |
| *A01K 97/12* | (2006.01) |
| *G06F 9/54* | (2006.01) |

(52) U.S. Cl.
CPC ............ *A01K 97/125* (2013.01); *G01S 15/42* (2013.01); *G01S 15/96* (2013.01); *G01W 1/10* (2013.01); *G06F 9/541* (2013.01); *Y02A 40/80* (2018.01)

(58) Field of Classification Search
CPC ....... A01K 97/125; G01S 15/42; G01S 15/96; G01W 1/10; G06F 9/541; Y02A 40/80
See application file for complete search history.

(56) References Cited

U.S. PATENT DOCUMENTS

| | | | | |
|---|---|---|---|---|
| 2011/0213515 A1* | 9/2011 | Haymart | ................ | A01K 97/00 707/769 |
| 2018/0059230 A1* | 3/2018 | Snyder | .................. | G06K 17/00 |

FOREIGN PATENT DOCUMENTS

| | | | | |
|---|---|---|---|---|
| CA | 2860278 A1 | * | 2/2016 | ............ A01K 97/00 |
| CN | 106443686 A | * | 2/2017 | ............ G01S 15/96 |
| CN | 109902761 A | * | 6/2019 | |
| JP | 2004192231 A | * | 7/2004 | |

OTHER PUBLICATIONS

Iiyama et al. (Fishing Spot Prediction by Sea Temperature Pattern Learning, Conference: 2018 Oceans—MTS/IEEE Kobe Techno-Ocean (OTO), May 2018, DOI:10.1109/OCEANSKOBE.2018. 8559299) (Year: 2018).*

(Continued)

*Primary Examiner* — Daniel R Miller
*Assistant Examiner* — Christian T Bryant
(74) *Attorney, Agent, or Firm* — Kinney & Lange, P.A.

(57) ABSTRACT

A real time fish movement and location guide system and method provides an output to an angler of a real time adjusted active fish depth range based upon a set of environmental conditions. Input data relating to the environmental conditions is received from the angler through a user interface and from Internet sources. In some embodiments, the input data is also used to provide outputs indicating weather fronts that will affect movement and location, and to provide lure recommendations and notifications that a change in lure is appropriate in view of changing conditions.

12 Claims, 5 Drawing Sheets

(56) References Cited

OTHER PUBLICATIONS

Papadakis et al. (Sub-second analysis of fish behavior using a novel computer-vision system, Aquacultural Engineering, vol. 62, 2014, pp. 36-41, ISSN 0144-8609, https://doi.org/10.1016/j.aquaeng.2014.06.003.) (Year: 2014).*

Bruneel et al. (Implications of movement for species distribution models—Rethinking environmental data tools, Science of The Total Environment, vols. 628-629, 2018, pp. 893-905, ISSN 0048-9697, https://doi.org/10.1016/j.scitotenv.2018.02.026.) (Year: 2018).*

Klemas ("Advances in fisheries applications of remote sensing," 2014 IEEE/OES Baltic International Symposium (BALTIC), 2014, pp. 1-21, doi: 10.1109/BALTIC.2014.6887836) (Year: 2014).*

White (Rules of thumb to catch more fish, USA Today, Jul. 16, 2015) (Year: 2015).*

Sampe (Fishing & Weather, Learning How To Fish, The Wayback Machine, Dec. 4, 2019, Fishing & Weather—Learning How To Fish (archive.org)) (Year: 2019).*

Fishing Factors (How Weather Factors Affect Fishing, Fish Ranger, Wayback Machine, Jan. 27, 2021, https://web.archive.org/web/20210127072443/https://www.fishranger.com.au/fishing_factors)(Year: 2021).*

Ultimate guide to fishing weather forecasts (The Ultimate guide to fishing weather forecasts, Fishbrain.com, Jul. 20, 2020) (Year: 2020).*

\* cited by examiner

|  |  | | | | | | Intensity Value |
|---|---|---|---|---|---|---|---|
| Light | | Night | Dawn/Dusk | Cloudy | Partly Cloudy | Clear Sky | |
| | | +5 | +2 | +1 | 0 | -1 | |
| Wind | | Very Heavy Waves | Heavy to Moderate Waves | Moderate to Light Waves | Light Waves to Ripples | No Wind | |
| | | +3 | +2 | +1 | 0 | -1 | |
| Water Temperature | | Warming (Early Season) | Extreme Warming (Summer) | Stable Temps | Cooling Temps | Cooling (Late Fall/Winter) | |
| | | +1 | -1 | 0 | -1 | -1 | |
| Water Clarity (Baseline) | | Baseline Dark 0-3 ft | Baseline Moderately Dark 3-5 ft | Baseline 5-8 ft | Clear 8-12 ft | Ultra Clear 12 ft+ | |
| | | +1 | +2 | 0 | -2 | -3 | |
| Water Clarity (Temporal) | | Temporal Darkening | Temporal Steady | Temporal Clearing | | | |
| | | +1 | 0 | -1 | | | |
| Weather Pattern | | Cooling Frontal | Warming Frontal | Stable | Minor Cold Front | Cold Front | Major Cold Front |
| | | +3 | +1 | 0 | -2 | -4 | -6 |
| Water Flow | | High | Normal | Low | | | |
| | | +1 | 0 | -1 | | | |
| Water Level: | Height | Very High 6 ft + | High 4-5 ft | Medium 1-3 ft | Low/Normal | | |
| | Rising | +5 | +3 | +2 | +1 | | |
| | Stable | +3 | +2 | +1 | 0 | | |
| | Falling | +2 | +1 | 0 | -1 | | |
| | | | | | | Intensity Score | |

Fig. 3

ACTIVE DEPTH ADJUSTMENT CHART

| Overall Value | Active Depth Adjustment |
|---|---|
| 1 + | No Change in FOW |
| 2 + | 1-3 feet shallower |
| 3 to 4 + | 3-5 feet shallower |
| 5 to 6 + | 5-7 feet shallower |
| 7 to 8 + | 7 to 12 feet shallower |
| 9 or greater + | 12 to 17 feet shallower |

| Overall Value | Active Depth Adjustment |
|---|---|
| 1 - | No Change in FOW |
| 2 - | 1-3 feet deeper |
| 3 - | 3-4 feet deeper |
| 4 - | 4-7 feet deeper |
| 5 - | 7 to 10 feet deeper |
| 6 or more - | 10 to 18 feet deeper |

Fig. 4

REAL-TIME FISH MOVEMENT AND LOCATION GUIDE

CROSS-REFERENCE TO RELATED APPLICATION(S)

This application claims the benefit of U.S. Provisional Application No. 62/967,297 filed Jan. 29, 2020 for "REAL-TIME FISH MOVEMENT AND LOCATION GUIDE" by Charles Christopher Gierke, which is hereby incorporated by reference in its entirety.

BACKGROUND

"Are you fishing where the fish are?" This is not a wise-guy question. It is THE question on fishing—the single most important concept an angler must keep in mind. Fish can be predictable at times and can seem to be unpredictable at other times. The question is not "are you catching fish?" The question must be "are you fishing where the fish are?" You can't catch fish if they're not there.

A part of fish locations is based on different times of year. It is widely accepted by anglers that fish spawn early in the spring. As the summer arrives, fish leave the spawning areas and head to deeper water. As fall arrives, fish will often move deeper yet, and in winter fish move deeper again. Seasonally, fish are in typical depths and locations habitually.

Fishing would be a breeze if the only considerations an angler needed were the seasonal locations of a particular species of fish. However, in addition to seasonal drivers, there are many environmental conditions that affect fish movement too. Anglers often do not know how fish respond to a single environmental condition, and when multiple factors are considered it can be extremely difficult to understand their effects on fish. To complicate things, any number of these environmental conditions change daily and sometimes change hourly.

In fishing, as in life, no two days are the same. It is an angler's adjustments to changing conditions that predict success. Following the fish as they move is the biggest challenge to anglers, especially since the environmental conditions can be either dependent or independent of each other.

A problem anglers face is how to interpret how any one of the seasonal or environmental conditions affects fish movements. An even more serious problem arises when anglers try to interpret and predict the effects of different combinations of environmental conditions on movement and location of fish.

SUMMARY

A real-time fish movement and location guide system provides an adjusted active fish depth range to a user based on a set of variable environmental conditions. The system includes a user interface, a communication system, a system memory, and a hardware processor. The user interface allows the user to provide inputs relating to one or more of the set of environmental conditions, and it also delivers outputs to the user, including the adjusted active fish depth range. The communication system obtains inputs relating to one or more of the set on environmental conditions from Internet sources. The system memory stores active fish depth range code including a depth adjustment module. The hardware processor is configured to execute the software code to: gather input data relating to the set of variable environmental conditions from the user interface and the communication system; assign a classification of each environmental condition based upon the input data associated with that environmental condition; produce an intensity value for each environmental condition based on the classification assigned to that environmental condition; combine the intensity values to produce a numerical intensity score; determine a depth adjustment based upon the intensity score; adjust a baseline active fish depth range based upon the depth adjustment to produce an adjusted active fish depth range; and output, to the user interface, the adjusted active fish depth range.

A method for providing an adjusted active fish depth range based on a set of variable environmental conditions includes the following steps: gathering input data relating to the set of variable environmental conditions; assigning a classification to each environmental condition based upon the input data associated with that environmental condition; producing an intensity value for each environmental condition based on the classification assigned to that environmental condition; combining the intensity values to produce a numerical intensity score; determining a depth adjustment based upon the numerical intensity score; adjusting a base line active fish depth range upon the depth adjustment to produce an adjusted active fish depth range; and outputting, to a user interface, the adjusted active fish depth range.

BRIEF DESCRIPTION OF THE DRAWINGS

FIG. 3 is a chart showing a set of eight environmental conditions, with multiple possible classifications for each environmental condition based on data inputs, with intensity values associated with the classifications, and with a column showing how the individual intensity values can be combined to produce a numerical intensity score.

FIG. 4 is an active depth adjustment chart showing different numerical intensity scores and corresponding active depth adjustments.

DETAILED DESCRIPTION

Fish move and locate differently based upon environmental conditions and seasonal factors. For example, fish may move shallower or deeper based upon light level, wind (and the waves it produces), water temperature, baseline water clarity, temporal water clarity, weather pattern, water flow, and water level (both its height versus normal and how it is changing, i.e. rising, stable, or falling). These conditions can change from day to day and even from hour to hour. The number of variables affecting fish movement and the number of different combinations of those variables makes any attempt by an angler to predict fish location very challenging and prone to error. Updating predictions on a real-time basis is even more challenging.

This disclosure describes a system and method that analyzes real-time environmental conditions that can affect a user's desired fishing location, based on input information provided by the user (angler) and input information obtained by a data fetch from Internet sources. The system and method classify the state of each of the environmental conditions based on the input information received, and then use the classifications to assign an intensity value for the current state of each environmental condition. The intensity values are combined to produce an intensity score from which a depth adjustment is determined. The depth adjustment is applied to a baseline active fish depth range to produce an adjusted real time active fish depth range, which is outputted through a user interface to the user. In addition, one or more of the classifications, intensity scores, depth adjustment, and adjusted real time active fish depth range can be used to determine other fishing related purposes, steps, calculations, or for storage in a database.

In some embodiments, the environmental condition data is used for other real time assistance to the user. These include notification of weather fronts that affect fish movement and location, recommendation of lure type, lure presentation speed, lure size, and lure color, to be used based upon environmental conditions, and notification of environmental condition changes that necessitate a lure change.

Figure 1:
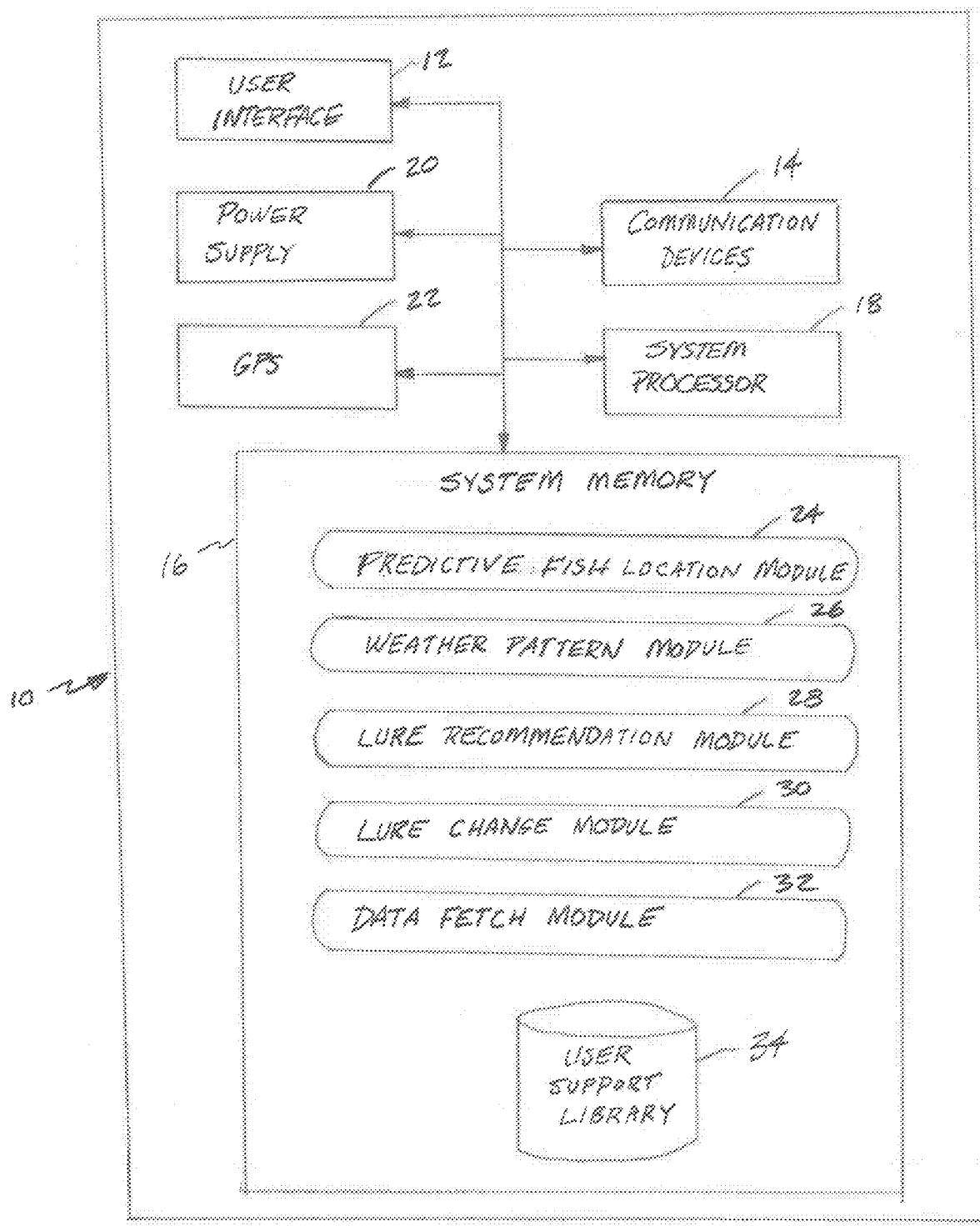
FIG. 1 is a block diagram of an example of a real-time fish movement and location guide system.

FIG. 1 is a block diagram of real time fish movement and location guide system 10, which is an electronic device that can be configured as a portable device such as a smart phone or tablet, or can be configured as or incorporated into a fishing electronics device (such as a fish finder or navigation aid) that is capable of being mounted on a boat. System 10 includes user interface 12, communication device 14, system memory 16, system processor 18, power supply 20, and GPS system 22. System memory 16 stores software code including predictive fish location module 24, weather pattern module 26, lure recommendation module 28, lure change module 30, and data fetch module 32. System memory also stores user support library 34, which can contain messages, displays, podcasts, designs, drawings, images, animation, audio and video content relating to fishing, as well as a database for time and data cataloging of user identified active depth locations.

User interface 12 includes a display, an audio speaker, and user inputs. The display can be a liquid crystal display (LCD), a light-emitting diode (LED) display, an organic light-emitting diode (OLED) display, or other display device suitable for providing information to users in graphical form or video. User interface 12 can include graphical and/or physical control elements that enable user input to interact with system 10. In some examples, user interface 12 can take the form of a graphical user interface (GUI) that presents graphical control elements presented at, e.g., a touch-sensitive and/or presence sensitive display screen of the display. In such examples, user input can be received in the form of gesture input, such as touch gestures, scroll gestures, zoom gestures, or other gesture input. In certain examples, user interface 12 can take the form of and/or include physical control elements, such as a physical buttons, keys, knobs, or other physical control elements configured to receive user input to interact with components of system 10.

Communications devices 14 provide system 10 to communicate with other devices. In particular, communication devices facilitate connection of system 10 with the Internet.

Predictive fish location module 24 determines a real-time adjustment to a baseline depth range for active fish based upon analysis of a set of variable environmental conditions. The baseline depth range may be provided to system by the user based upon the user's fishing knowledge and experience, may be obtained from fishing reports from bait stores, newspapers, or Internet sites, or may be based upon a seasonal depth calendar. The analysis of each the environmental conditions includes characterizing each environmental condition, assigning a numerical intensity value to each environmental condition based on its characterization, producing an intensity score based on all of the intensity values, determining a depth adjustment based on the intensity score, and producing a real-time adjusted active fish depth range, based on a baseline active fish depth range and the depth adjustment, that is outputted through user interface 12.

Weather pattern module 26 uses weather data (such as, for example, temperature, barometric pressure, etc.) over a time period to classify the weather pattern as one of: (a) a cooling frontal, (b) a warming frontal, (c) stable, (d) a minor cold front, (e) a cold front, or (f) a major cold front. That classification is used by predictive fish location module 24 as part of the process of assigning intensity values, producing an intensity score, and determining a depth adjustment. In addition, weather pattern module 26 can provide a notification to the user of the presence of a weather front or change of weather pattern based on the analysis of the temperature data. Other factors, such as barometer reading, movement trend elements, and fish spookability can also be considered in providing the notification.

Lure recommendation module 28 uses a plurality of intensity values based on a subset of the environmental conditions (such as light level, water clarity, and wind) to make recommendations to the user of appropriate lure selections. Other inputs such as weather pattern/cold front information from weather pattern module 26 and user inputs based on a user questionnaire can also be used. The recommendation can include displaying photographs of recommended lures.

Lure change module 30 provides notifications to the user when a change in a subset of the environmental conditions leads to a recommended change of lures. For example, changes in light level, water clarity, and wind can result in a recommendation to change lure color, lure type, or lure size, or to change to a lure that generates sound. The notification can be accompanied with an explanation of the reason for a change of lure, and can include displaying photos of the newly recommended lures.

Data fetch module 32 obtains data relating to the environmental conditions that will be used by the other modules. Data fetch module 32 makes use of application programming interface (API) software to gather data from Internet sources.

System processor 18 executes the code stored in system memory in 16 to perform the functions associated with modules 24, 26, 28, 30, and 32. It also controls delivery of content from user support library 34 to user interface 12.

Power supply 20 provides electrical power to the electrical components of system 10. Power supply can include batteries and circuitry to provide the power required by the components. And can also include connections to allow power to be supplied from a source external to system 10.

GPS circuitry provides location information to system 10. This can be used, for example, by modules 24 and 26, and also in user support library 34.

Predictive Fish Location Module 24

Figure 2:
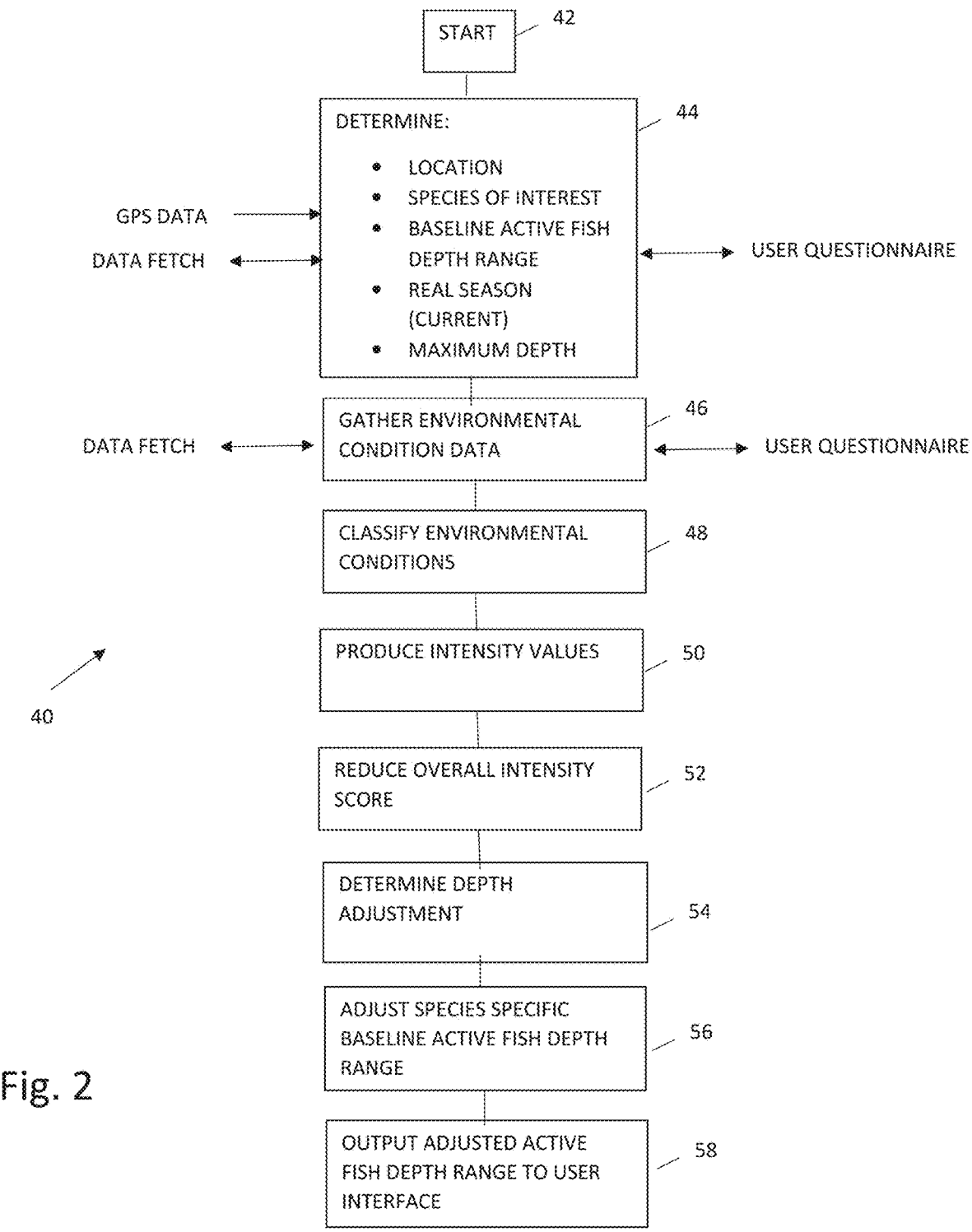
FIG. 2 is a flow diagram of operation of the real-time fish movement and location guide in producing a real time adjusted active fish depth range based upon environmental condition data inputs received from a user and from Internet sources.

FIG. 2 is a flow chart of process 40, which produces and outputs to user interface 12 a real-time adjusted active fish depth range based upon environmental condition data from the user and from Internet sources. Process 40 includes steps 42, 44, 46, 48, 50, 52, 54, 56, and 58. System processor 18 performs process 40 by executing software code in predictive fish location module 24 and weather pattern module 26.

At step 42, process 40 starts in response to an input from the user through user interface 12. At step 44, system processor 18 determines basic information that will be used to produce an adjusted species—specific active first depth range based on current environmental conditions. The basic information can include: location, fish species of interest, baseline active fish depth range, current real season of fish location, and maximum depth of the body of water.

The basic information can be obtained through a user questionnaire provided through user interface 12, through a data fetch of information from Internet sources using data fetch module 32, from data stored in user support library 34, and from GPS system 22. Location data can be provided by GPS system 22 if the user and system 10 are at the intended body of water. If not, the desired fishing location can be provided by the user through the user questionnaire. The species of interest and the current real season also can be provided through the user questionnaire. The species-specific baseline active fish depth range and the maximum depth of the body of water can be provided through the user questionnaire, by a data fetch, or from user support library 34.

At step 46, environmental condition data is gathered. In one example, eight variable environmental conditions are used: (a) light, (b) wind, (c) water temperature, (d) baseline water clarity, (e) temporal water clarity, (f) weather pattern, (g) water flow, and weather level (height above/below normal and temporal change, i.e. rising, stable, or falling). Both the user questionnaire and the data fetch are used to gather environmental condition data. In one embodiment, light, wind, weather pattern, and water level data are obtained by data fetch, water temperature, water clarity (baseline and temporal), and water flow data are obtained from the user through he user questionnaire.

At step 48, each of the eight environment condition is assigned a classification based on the data gathered at step 46. The classification of weather pattern is performed by system processor 18 using weather pattern module 26 and the classification then provided to predictive fish location module 24. For each of the other seven environmental conditions, assignment of a classification is performed by system processor 18 with prediction location module 24.

At step 50, system processor produces an intensity value for each environmental condition based on its assigned classification. The intensity value is a numerical value and can be, for example an integer that is positive, negative, or zero. The magnitude and sign of the integer is scaled based upon the effect of the particular environmental condition.

FIG. 3 is a chart that visually illustrates the set of eight environmental conditions, which multiple classifications for each condition, and with an intensity value for each possible classification of each environmental condition. Also shown is a column in which the intensity value can appear, and a box for overall an intensity score that is generated by adding the column of individual intensity values.

As seen in FIG. 3, light has five possible classifications: night, dawn/dusk, cloudy, partly cloudy, and clear sky. The corresponding intensity values are +5, +2, +1, 0, and −1, respectively.

Wind has five possible classifications: very heavy waves, heavy to moderate waves, moderate to light waves, light waves to ripples, and no wind. The corresponding intensity values are +3, +2, +1, 0, and −1, respectively.

Water Temperature has five possible classifications: warming (early season), extreme warming (summer), stable temperatures, cooling temperatures, and cooling (late fall/winter). The corresponding values are +1, −1, 0, −1, and −1, respectively.

Baseline Water Clarity has five possible classifications: baseline dark 0-3 ft, baseline moderately dark 3-5 ft, baseline 5-8 ft, clear 8-12 ft, and ultra clear 12 ft. These are typically based on Secchi disk readings. The corresponding intensity values are +1, +2, 0, −2, and −3.

Temporal Water Clarity has three possible classifications: temporal darkening, temporal steady, and temporal clearing. The corresponding intensity values are +1, 0, and −1 respectively.

Weather Pattern has six possible classifications: cooling frontal, warming frontal, stable, minor cold front, cold front, and major cold front. The corresponding intensity values are +3, +1, 0, −2, −4, and −6.

Water flow has three possible classifications: high, normal, and low. The corresponding intensity values are +1, 0, and −1.

Water Level is classified both on the basis of height (very high ≥6 ft over normal, high 4-5 ft, medium 1-3 ft, and low/normal) and level change (rising, stable, falling). As a result, there are a total of twelve possible classifications. There are a total of four different intensity values for each of rising, stable, and falling water level, as shown in FIG. 3. The intensity values range from as high as +5 to as low as −1.

At step 52, an overall intensity score is produced. In the example being discussed and as illustrated in FIG. 3, the intensity score can be generated by summing the eight intensity values that correspond to the eight classification results. In other embodiments, different number of environmental conditions can be used, different intensity values can be assigned, and different mathematical combinations of the intensity values can be used to generate the overall intensity score.

At step 54, a depth adjustment is determined based on the intensity score. FIG. 4 is an active depth adjustment chart that illustrates active depth adjustments for different overall values (intensity scores). As shown in FIG. 4, intensity scores that are +2 or higher result in adjusting depth range to be shallower. Intensity scores that are −2 or lower result in adjusting depth range deeper.

At step 56, a species-specific baseline active fish depth range is adjusted using the depth adjustment derived from the intensity score. The baseline depth range is adjusted by adding the active depth adjustment, the upper depth, and to the lower depth of the baseline depth range.

In some cases, a body of water may have a maximum depth which is too shallow to permit the full range of adjustment. In that case, the adjustment can be modified by, for example, making a proportional active depth adjustment based on the maximum depth of the body of water.

The baseline active fish depth range can be based on the user's knowledge and experience, provided through the user questionnaire. Alternatively, published depth charges can be used and can be provided by a data fetch or user questionnaire.

Figure 5:
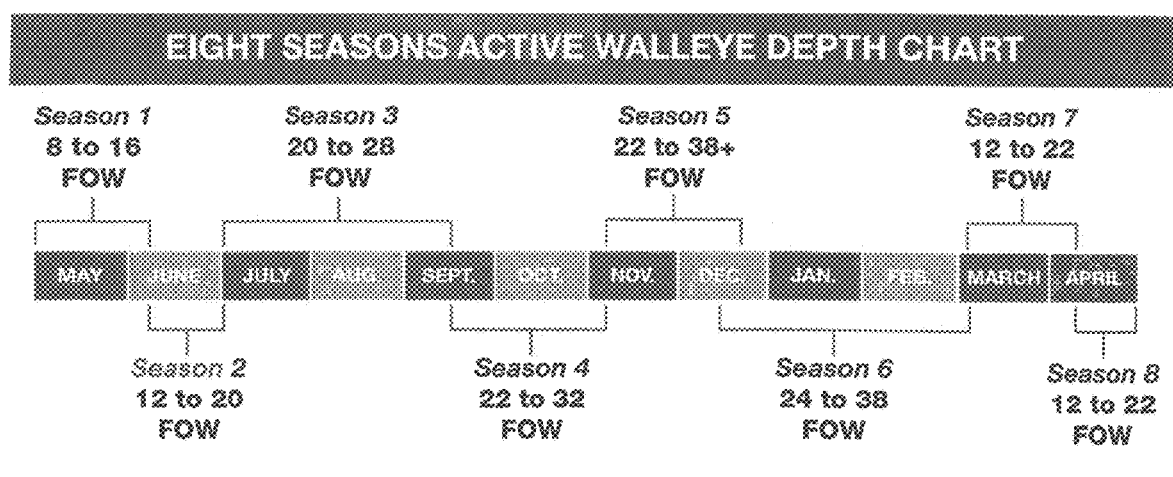
FIG. 5 is a species-specific baseline depth chart for an eight real-season fishing year.

FIG. 5 illustrates an eight season active walleye depth chart that sets out eight real seasons of walleye activity, each real season having a different depth range. The relationship of real seasons of the months shown in FIG. 5 is approximate and can vary from year to year and even from month to month. The real seasons are:

Season 1

Key on high flow areas that have high water, but note when the water drops walleye disperse. If the flow is high, they will be in current seams and current breaks. If the flow is moderate, fish will be in the main channel. Walleye will also be found on the first breakline on shoreline structure, emerging weedlines, and shallow structure (if early spring).

Season 2

Baitfish are beginning to appear. To find walleye, focus on weedlines that are developed, first and second breaklines on shoreline structure, as well as shallow off shore structure. The tops of off shore structure in deep water can be good too.

Season 3

Walleye can be found in all areas on off shore deep structure, the top of and the breakline to soft bottom. Second breakline on shoreline structure are also key areas. Deep nowhere spots on oxygenated lakes fish spread out over soft bottom. Fish can be found in open water where loons or gulls target baitfish (which are now abundant) below the Euphotic Zone.

Season 4

Baitfish remain abundant. Walleye will be found in all areas on off shore deep structure (top of and breakline to soft bottom). Extended shoreline shelves and river narrows are good too.

Season 5

Baitfish are now scarce and will remain that way until the following year's spawn. However, walleye will continue to be found in all areas on off short deep structure (top of and breakline to soft bottom). Extended shoreline shelves and river narrows remain good as well.

Season 6

All areas of structure near wintering hole. The wintering hole can often be the deepest part of a lake. Focus on deep and steep portions near the transition zone. On rivers, the deepest stretch will hold walleye. Typically this can be the deepest areas the furthest upstream.

Season 7 (Pre-Spawn and Spawn)

Walleyes will be staging in deep water areas adjacent to a spawning stream entrance. Fish can also be found in the middle of the main river channel middle before flow increases or in current seams in high water.

Season 8 (Post Spawn)

Walleyes are now in fallback spots which are areas that offer cover in relative deep water where fish can feed without high forage costs. Fallback spots are between the staging areas and the summer ranges.

At step 58, the adjusted active fish depth range is outputted to the user interface 58 for display. In addition to the depth range, other related fishing information from user support library can be made available to the user. In other embodiments, other seasons can be included. For example, in another embodiment eleven seasons are used: winter, winter transition, pre-spawn, spawn, post spawn, the spring bite, warm summer, bug hatch, hot summer, cool fall, cold fall.

Weather Pattern Module 26

Weather pattern module 26 works in conjunction with predictive fish location module 24 to classify six different weather patterns for use in adjusting active fish dept ranges. In addition, each of the six classified weather patterns can be used to generate recommended actions that will enhance fishing yield, from fish depth adjustments, to location adjustments, to lure and presentation adjustments. In other embodiments, other weather patterns (e.g. pre-storm) can also be included.

Cold fronts are when cold air rapidly advances and overtakes warm air. The result is a significant air temperature cooling after the front. It is useful to understand how long the front's effects on fish will last, based on the past, present, and forecasted air temps.

As a result of a cold front the exact time it lasts is analyzed here using a method described here. The exact time the cold front effects or the weather pattern leaves is based on air temperatures.

Cold fronts are commonly known throughout fishing and often are looked upon like the Black Death from medieval times. It is true that cold fronts result in harder fishing and often poorer results but it is not impossible to catch fish during cold fronts. It is simply that anglers do not know they are in a cold front, so they fish as if it were not there. This is why anglers do so poorly in cold fronts.

The following is a description of the process used by system processor 18 and weather pattern module 26.

Programming Logic

Legend

H=The temperature at noon.

Hr=Range from H to the next H. This range is 24 hours.

A=The first temperature past H equal to −10 degrees of H.

R=Range from A to 24 hours after A.

Bx=Anytime the temperature is 1 degree greater of A during R.

X=Anytime in the future of R the temperature is 1 degree greater than A.

1. Compute and record the present time of day and date the user is presently using the app.

2. Search and record for H one month prior to the present time of day and date.

3. At H, start the H to A search. The search will compute the differences in the air temperatures of H and A.

3a. If A is not found in the 24 hour range of H to H then start the H to A search at the later H.

3b. Search for A until found.

4. When A is found, create R, a range from A to 24 hours after A.

5. Within R search for Bx or X. The search will compute the air temps of H, A, and Bx.

5a. Sometime during R or at the end of R a two way divergent path will result in either outcome Bx or X.

6. If Bx is found Find H as either the highest temperature in R or the next H after R. Use whichever temperature is higher.

6. If Bx is found Find H as either the highest temperature in R or the next H after R. Use whichever temperature is higher.

6a. Once H is found according to line 6. Cycle again at line 3.

7. If X is found Find H use the next H.

7a. Once H is found according to line 7. Cycle again at line 3.

User Display Designation Based on the H to a to Bx or X Search Query

1. The weather patterns are classified and assigned as a result of the software program search query cycle of H to A to Bx or H to A to X.

2. If the search query finds H to A to Bx and not X then the software classify list the weather pattern of the range from H to A to Bx and future on to the next H as "Stable."

3. If the search query finds X and not Bx, then a "Cooling Frontal" weather classification is assigned at 12 hours before A to A. This 12-hour range may or may not include H.

4. If the search query finds X and not Bx, then a "cold front" classification is assigned.

5. The cold front designation is assigned to the range of A to X.

6. The cold front has three subcategories, and each subcategory is classified by the temperature difference as follows:

7. At any point in time the temperature of range A to X is −10 to −12 of H then a "Minor Cold" front is classified at that point.

8. At any point in time the temperature of range A to X is −13 to −20 of H then a "Cold Front" is classified at that point and displayed for the user.

9. At any point in time the temperature of range A to X is −20 and colder of H then a "Major Cold Front" is classified and displayed for the user.

10. If the search query finds X and not Bx, then a "Warming Frontal" weather classification is assigned 6 hours before X and 6 hours after X.

11. The "Warming Frontal" weather classification of 12 hours prior to A or 12 hours after X will overwrite any previously designated classification.

12. Each second of time in this app program can have only one classification.

Analysis Rules

To Find A

"A" must be found within Hr If A is not found in Hr use the later H to find A in the next H to A cycle.

Therefore, H to A is limited by time and cannot take more than 24 hours.

To Find H after Bx (cycle starts again).

Find H as either the highest temperature in R or the next H after R. Use whichever temperature is higher.

To Find H after X (cycle starts again).

If X find the next H.

R starts at A and lasts 24 hours.

This range creates a buffer to stop cold front designation based on air temperature differences alone.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:

1. A method for providing an adjusted active fish depth range based on a set of variable environmental conditions, the method comprising:
   gathering input data relating to the set of variable environmental conditions, wherein the environmental conditions include two or more of:
   light;
   wind;
   water temperature;
   baseline water clarity;
   temporal water clarity;
   weather pattern;
   water flow; and
   water level;
   assigning a classification for each environmental condition based upon the input data associated with that environmental condition, wherein each environmental condition has at least three different possible classifications from which the assigned classification is selected, the at least three different possible classifications for each environmental condition being pre-defined based on possible input data associated with the environmental condition, each of the at least three different possible classifications for each environmental condition having an associated numerical intensity value such that a range of numerical intensity values defined by the at least three different possible classifications for each environmental condition includes a negative integer, zero and a positive integer;
   selecting the numerical intensity value associated with the assigned classification for each of the two or more environmental conditions to define a group of two or more numerical intensity scores;
   summing the group of numerical intensity values to produce a single numerical intensity score;
   determining a depth adjustment based upon the single numerical intensity score;
   adjusting a species-specific baseline active fish depth range based upon the depth adjustment to produce an adjusted active fish depth range; and
   outputting, to a user interface, the adjusted active fish depth range.

2. The method of claim 1, and further comprising:
   selecting the base-line active fish depth range based upon at least one of the species of fish of interest, time of year, and seasonal movement patterns of fish.

3. The method of claim 1, wherein gathering input data includes:
   performing a data fetch using an application program interface (API); and
   presenting to a user, through a user interface, a questionnaire for the user to provide input data.

4. The method of claim 1, further comprising:
   providing a fishing recommendation based on a combination of at least two of the numerical intensity values.

5. The method of claim 4, wherein the fishing recommendation is a lure recommendation.

6. The method of claim 4, wherein the fishing recommendation is a lure change.

7. The method of claim 1, wherein the environmental conditions include light, and wherein classifications of the light include night, dawn/dusk, cloudy, partly cloudy, clear sky.

8. The method of claim 1, further comprising:
   determining user location based on GPS data; and
   fetching weather data associated with the user location.

9. The method of claim 1, wherein assigning a classification includes assigning as one of a plurality of weather pattern classifications based on upon temperature data.

10. The method of claim 9, wherein the plurality of weather pattern classifications include: cooling frontal, warming frontal, stable, minor cold front, cold front, and major cold front.

11. The method of claim 9, and further comprising:
outputting, through the user interface, a message indicating the weather pattern classification currently present.

12. A system for providing an adjusted active fish depth range based on a set of variable environmental conditions, the system comprising:
   a user interface through which a user can provide inputs relating to one or more of the set of variable environmental conditions, and through which outputs can be delivered to the user;
   a communication system through which inputs relating to one or more of the set of variable environmental conditions can be obtained from Internet sources;
   a system memory that stores active fish depth range code including a depth adjustment module; and
   a hardware processor that is configured to execute the active fish depth range code to:

gather input data relating to the set of variable environmental conditions through the user interface and the communication system, wherein the environmental conditions include two or more of:
light;
wind;
water temperature;
baseline water clarity;
temporal water clarity;
weather pattern;
water flow; and
water level;
assign a classification for each environmental condition based upon the input data associated with that environmental condition, wherein each environmental condition has at least three different possible classifications from which the assigned classification is selected, the at least three different possible classifications for each environmental condition being predefined based on possible input data associated with the environmental condition, each of the at least three different possible classifications for each environmental condition having an associated numerical intensity value such that a range of numerical intensity values defined by the at least three different possible classifications for each environmental condition includes a negative integer, zero and a positive integer;
select the numerical intensity value associated with the assigned classification for each of the two or more environmental conditions to define a group of two or more numerical intensity scores;
sum the group of intensity values to produce a single numerical intensity score;
determine a depth adjustment based upon the single numerical intensity score;
adjust a baseline active fish depth range based upon the depth adjustment to produce an adjusted active fish depth range; and
output, to the user interface, the adjusted active fish depth range.

* * * * *